No. 855,897. PATENTED JUNE 4, 1907.
H. W. LEONARD.
CONTROLLER FOR ELECTRIC MOTORS AND SIMILAR DEVICES.
APPLICATION FILED JULY 11, 1903.

WITNESSES:

INVENTOR

No. 855,897. PATENTED JUNE 4, 1907.
H. W. LEONARD.
CONTROLLER FOR ELECTRIC MOTORS AND SIMILAR DEVICES.
APPLICATION FILED JULY 11, 1903.

WITNESSES:

INVENTOR

No. 855,897. PATENTED JUNE 4, 1907.
H. W. LEONARD.
CONTROLLER FOR ELECTRIC MOTORS AND SIMILAR DEVICES.
APPLICATION FILED JULY 11, 1903.

WITNESSES:
Henry C Ellis
Hugo Boepple Jr.

INVENTOR
H. Ward Leonard
BY
ATTORNEY

No. 855,897. PATENTED JUNE 4, 1907.
H. W. LEONARD.
CONTROLLER FOR ELECTRIC MOTORS AND SIMILAR DEVICES.
APPLICATION FILED JULY 11, 1903.

Witnesses
L. R. Sager
Ivan Konigsberg

Inventor
H. Ward Leonard
By his Attorney
C. N. Edwards

UNITED STATES PATENT OFFICE.

HARRY WARD LEONARD, OF BRONXVILLE, NEW YORK.

CONTROLLER FOR ELECTRIC MOTORS AND SIMILAR DEVICES.

No. 855,897.     Specification of Letters Patent.     Patented June 4, 1907.

Application filed July 11, 1903. Serial No. 165,061.

*To all whom it may concern:*

Be it known that I, HARRY WARD LEONARD, a citizen of the United States, residing at Lawrence Park, Bronxville, in the county of Westchester and State of New York, have invented a certain new and useful Improvement in Controllers for Electric Motors and Similar Devices, of which the following is a specification.

My invention relates principally to the devices employed for starting and regulating the speed of electric motors, and to the devices employed for protecting such devices and the motor against damage due to abnormal variations in the circuit. Heretofore such devices, and particularly the starters and speed controllers, were preferably entirely separate pieces of apparatus, and were operated independently of each other. Such arrangements of the controlling devices are frequently the cause of injury to the motor and controlling means due to the improper operation of the separate devices, and to carelessness or ignorance on the part of the operator.

One object of my invention is to combine a motor starter, speed regulator, and automatic protective devices with interlocking means, whereby the several elements constituting the controller can only be operated in the proper sequence to start and regulate a motor, and so that the protective devices will always be in a position to respond to abnormal changes in the motor circuit, and whereby the starting of a motor and the control of its speed will be "fool proof;" that is to say, the controlling apparatus and the motor will be entirely safe even in the hands of inexperienced, careless or ignorant operators.

In the operation of many kinds of machine tools and other appliances by electric motors, it is very desirable that there be provided a simple, efficient, reliable, inexpensive and compact form of controlling apparatus by means of which the motor can be started and brought to full speed, and later, if necessary, operated at any speed over as wide a range of speed as possible. On account of the efficiency and simplicity of the method, it is very desirable to secure the speed variation by varying the field strength of the motor. Electric motors have now been so far improved as regards freedom from sparking, that they require very little attention in operation, even when the field is varied over a very wide range, and hence in future these motors will be very extensively employed in the operation of machine tools and in performing many other kinds of work where a wide range of speed is of value, and especially where the torque varies inversely as the speed to such an extent that the power of the motor is more or less constant.

The controlling apparatus for such motors should have the following characteristics: First, an overload protective device which will positively and instantaneously open the circuit to the motor if under any conditions of starting or operation a current greater than a certain predeterminable amount should flow in the motor circuit. Second, this overload device must be such that the motor can be safely and simply started up again by the operator without loss of time and without expense. Third, a "no voltage release" or electro-responsive device which will automatically act if the supply voltage fails, or is reduced to a very low point, to protect the motor against the risks due to a sudden rise to full voltage, and such "no voltage" device shall be dependent upon the volts upon the motor armature and shall be independent of any current through the motor. Fourth, a device by the manipulation of which the operator can readily change the speed of the motor gradually and over a wide range, so that, for example, a cutting tool can be worked in the most efficient manner at any speed and cut within the capacity of the motor. Fifth, a starting rheostat. Sixth, interlocking or functionally related mechanism, or equivalent arrangement of mechanism, which will insure the proper sequence of adjustments, and whereby it will be impossible for the operator to start the motor while the motor has an improperly weakened field. While this interlocking or equivalent mechanism is preferably arranged directly between the speed controlling device and the motor starter, it is evident that it may be applied between any device controlling the speed controller and any device which controls the current passing through the motor armature, such as a switch in series with the motor armature and starter.

The desirable features above set forth are embodied in the controller invented by me and in carrying my invention into effect I preferably employ a "no voltage" switch and an "overload" switch, which are functionally connected, and the "no voltage" switch serving also as the contact arm of the starting rheostat. Both these switches are preferably spring actuated so as to tend to move to the open circuit position, and the overload switch is preferably moved to its closed position by the movement of the "no voltage" switch to its starting position. The overload switch is held closed by a latch which is released through the agency of an electro-responsive device which is set to respond to a predetermined flow of current, and the "no voltage" switch may be held by a similar form of latch, which is released through the agency of an electro-responsive device which responds to an abnormal drop in the voltage, or said switch may be held by magnetism against the pull of the spring connected with said switch, so that when the voltage fails or drops abnormally, the magnetism will be insufficient to hold the switch against the pull of its spring. I also employ a rhoestat which is designed to be connected in series with the field winding of the motor. This rheostat preferably has a large number of steps so as to secure great refinement in the graduation of the field strength of a motor and thus secure perfect control of the speed of the motor armature. Between the operating devices of the starting rheostat and the field rheostat, I provide in my preferred form an interlocking or otherwise functionally related device, the function of which is to lock the switch arm of the starting rheostat in the initial or open position if the field rheostat is in a position which will produce a field too weak to secure the best results in starting the motor. This interlocking device consequently makes it necessary that the operator should adjust the field rheostat until he secures a predeterminable proper strength, and the proper adjustment of the field rheostat removes the interlock and permits the operator to move the armature controlling switch lever to start or control the motor armature. This interlocking device may be a latch which is moved to locking position by the movement of the field rheostat handle in the direction to insert resistance and obtain a weakened field and which latch is unlocked when the handle is returned to the position of full field strength. Thus if no voltage or overload occurs while the motor has a weakened field, as it would generally have in practice, the switch lever of the starting rheostat when returned to the starting position would be locked, and before the motor could be started again the operator would first have to readjust the field rheostat to produce a field of predeterminable and proper strength before the circuit is closed at the starting rheostat.

My invention is illustrated in the accompanying drawings in which.

Referring to the drawings, A indicates the contact arm of the motor starter and $a$ the contact buttons of the resistance sections.

B is the overload switch which enters spring contact blades $b$ and which are provided with an auxiliary break $b'$ to protect the blades from excessive sparking.

A and B are pivoted on a common stud and a spring $a'$ coiled around the stud, and having its ends secured to the switch arms, tends to drive said arms toward each other.

Figure 2:
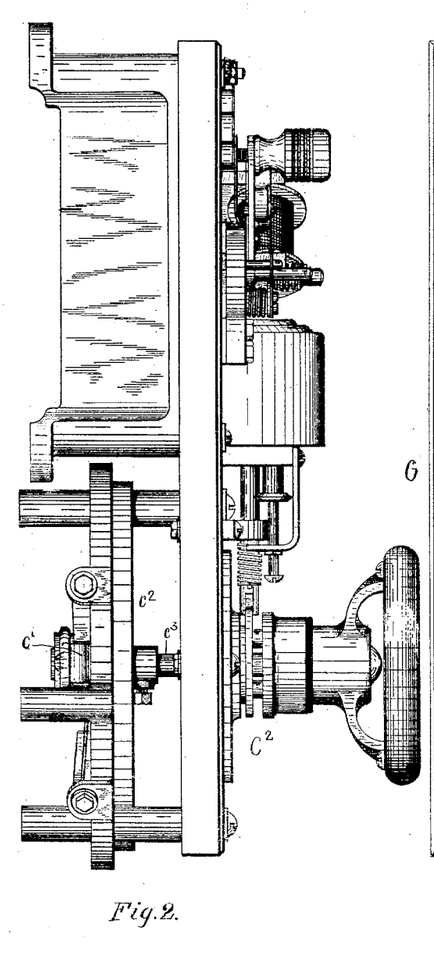
Fig. 2 is a side elevation thereof.
Figure 3:
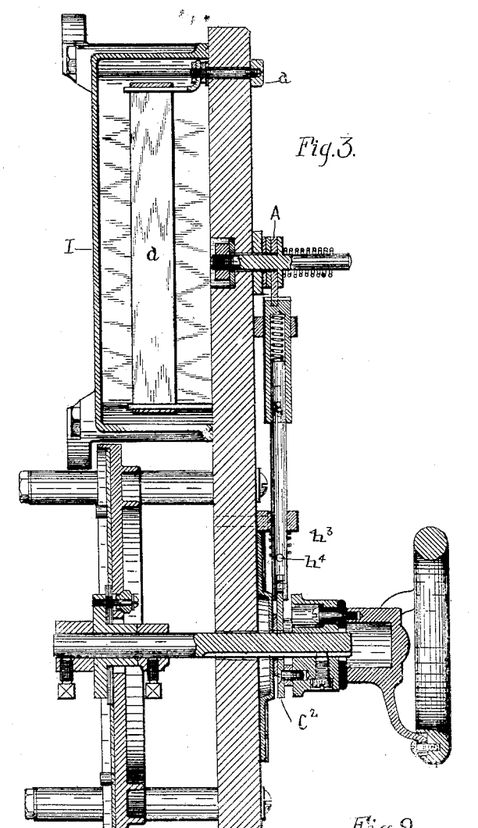
Fig. 3 is a central vertical section thereof.
Figure 4:
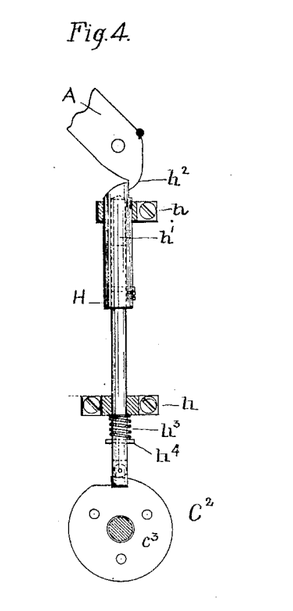
Fig. 4 is a detail view of the locking device.

$b^2$ is a rubber or other buffer on switch B against which arm A strikes when either arm is propelled by its spring and through which switch B is moved to its closed position by arm A. Switch B is held in its closed position by a latch $d$ engaging pin $d'$ on the switch. This latch is pivoted upon the base plate G and is tripped by a plunger $d^2$ which is actuated by a blow from the core of overload solenoid D. The position of this core is adjustable by means of a screw $d^3$ whereby the overload device will be caused to respond to a predetermined current flow. The no voltage switch or starting lever A is provided with an armature $e$ which is held by the magnetism of magnet E when the arm is in its final position. Upon an abnormal drop in the voltage, the magnetism of magnet E will be insufficient to hold lever A against the pull of its spring and hence that lever will return to its initial position. If an overload should occur switch B will be released and it will open the circuit and move toward arm A until arrested by the buffer $b^2$. This opening of switch B also deënergizes magnet E and to close switch B against arm A is returned to its starting position—the position shown in the drawing. C is the operating device for the field rheostat, the resistance $c$ (Figs. 5—8) of which is enameled to a metal plate $c^2$ (Fig. 2). This operating device is secured to a shaft $c^3$ which has secured to its opposite end the contact blade $c'$. On the shaft $c^3$ is a cam or equivalent device $C^2$ which coöperates with a locking bolt H arranged to slide in guide blocks $h$. This bolt is shown in two telescoped sections with a spring $h'$ (Figs. 3 and 4) for driving the locking end forward into the path of a shoulder $h^2$ on contact arm A. The locking bolt as a whole is retracted by spring $h^3$ placed between a pin $h^4$ and one of the bearings $h$. The position of cam $C^2$ is such that when no resistance $c$ is in circuit spring $h^3$ will be free to retract the bolt and permit the operation of contact arm A. When however resistance is inserted and bolt H is pushed forward, the locking end will stand in the path of shoulder $h^2$. If now arm A returns to its initial position the curved side of shoulder $h^2$ will engage with and depress the locking end of the bolt against its spring $h'$ and said end will immediately spring back and stand in front of shoulder $h^2$ and prevent arm A from being moved away from its initial position. Thus the apparatus will be locked and the motor cannot be started until the locking bolt is withdrawn from the path of shoulder $h^2$. This is accomplished by returning handle C to its starting position, i. e. where all field resistance will be cut out, and at which position the depression on the cam plate will be under the bolt and spring $h^3$ will retract the bolt.

The resistance of the starting rheostat is preferably carried on the under side of base G and is embedded in fine sand contained in a cast iron box i secured to the base plate.

Figure 1:
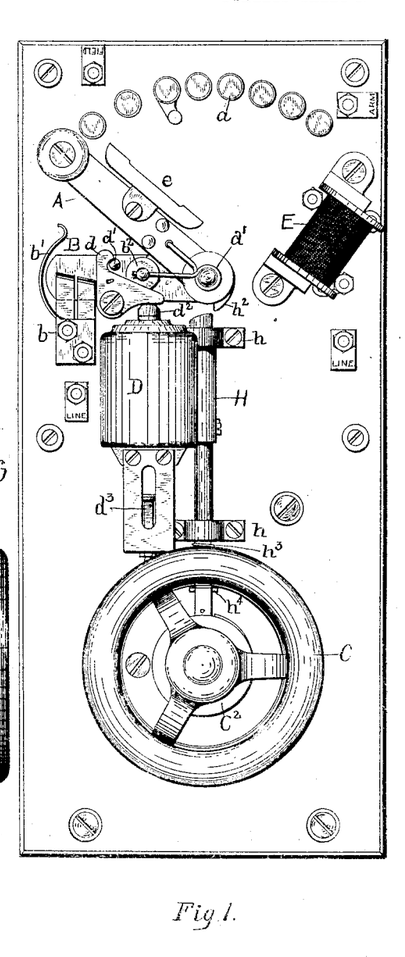
Figure 1 is a plan view of one form of the complete controller.
Figure 5:
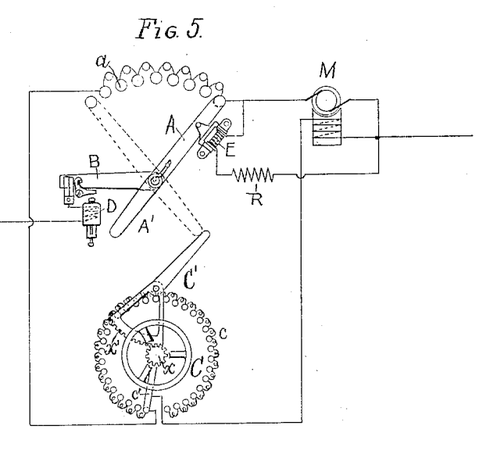
Figs. 5 and 6 are diagrammatic illustrations of modified arrangements.

In Fig. 5 I have illustrated a modification wherein the contact arm of the starter, or an extension thereof, if so arranged that when it is moved from its final position to the initial position, it engages with the field controller, and operates it so that when the contact arm of the starter reaches its initial position, the resistance of the field rheostat will be all cut out of circuit, thus avoiding the necessity of returning the operating device of the field rheostat by hand before starting as in the construction of Fig. 1. In this modification A is the contact arm of the starter, $a$ the resistance, B is the overload circuit breaker switch, C is the operating device of the field rheostat and $c$ the resistance sections thereof. A' is the extension on arm A and C' is a pivoted lever having its free arm in the path of movement of extension A' and the other end is a toothed arc $x'$ which meshes with spur gear $x$ on the shaft of operating device C. In practice the contact buttons of a field rheostat are arranged to form almost a complete circle so that in moving its contact blade from one extreme to the other the operating device and shaft make nearly a complete revolution. For this reason the toothed arc $x'$ will be provided with the same number of teeth as spur gear $x$ and be so proportioned, that, in moving device C from one extreme position to the other, arm C' will move a distance corresponding to the angular movement of arm A' from its initial to its final position. In the position shown arm AA' is in the final position, and all the resistance of the field rheostat is cut out. Contact arm A and extension A' are free to move back and forth without striking lever C', when no resistance $c$ is in circuit. If device C is rotated to cut in resistance, lever C' will move toward arm A', and should arm A be released and propelled toward its initial position, arm A' will encounter lever C' and drive that lever back to its initial position so that the apparatus will be in proper position to again start the motor. It will also be noted that when arm A is in its initial or starting position, as shown in dotted lines, device C cannot be operated to connect resistance into the field circuit of the motor since arm A' stands in the path of lever C' and locks it and hence device C against movement.

Figure 6:
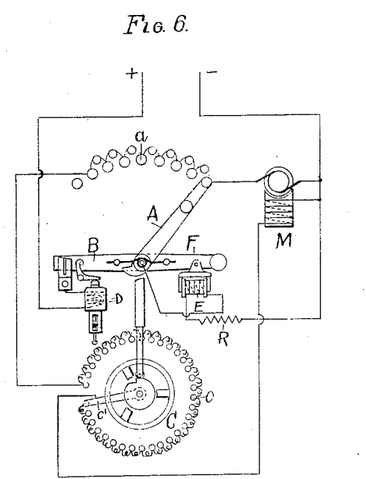

In Fig. 6, I have shown a speed controlling rheostat instead of a motor starter. In some cases it is desirable to obtain the speed variation by a combination of armature controlling means and field controlling means. In this form arm A is a resistance adjusting switch, that is, it is not spring actuated, and instead of holding this arm by the "no voltage" magnet, I provide an additional spring actuated lever F which carries the armature for magnet E. When "no voltage" occurs lever F will be driven toward arm A and drive it to the initial position. In starting, if the field rheostat is in proper position, arm A can be moved forward to close the circuit, and then lever F is moved around to magnet E where it will be held, and arm A may now be adjusted and left at any desired point. If lever F is not held by magnet E, arm A cannot remain in position, since the spring will drive lever F backward and hence arm A to the initial position. The other parts illustrated in Fig. 6 are similar to Fig. 1.

In some cases the motor may have a series winding on the field, so that the field will be affected by the armature current.

Figure 7:
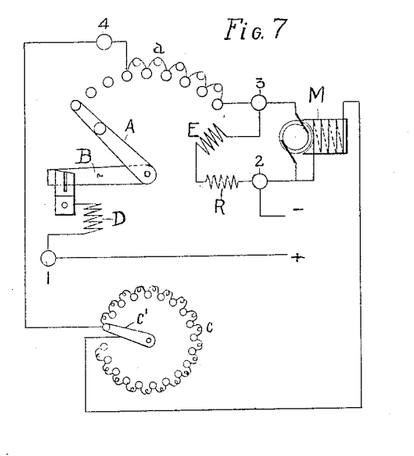
Figs. 7 and 8 are diagrams illustrating circuit connections.
Figure 8:
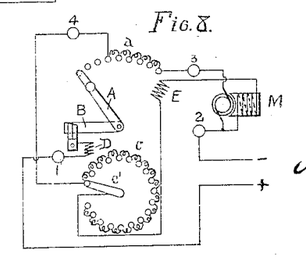

I have shown the "no voltage" coil E in Figs. 5, and 7 as connected across the motor armature terminals with a resistance R in series with it. Sometimes I connect the "no voltage" coil in series with the shunt field winding of the motor, as shown in Fig. 8, in which case I prefer to use the form in which a solenoid normally sustains a magnetic weight which falls upon the occurrence of "no voltage" and opens a latch which releases the starting arm as shown in my application filed June 1, 1903, Serial No. 159,528.

In the case of a motor speed controller such as is shown in Fig. 6 and in which the resistance controlling arm is not spring actuated, I prefer to connect the terminal of the no-voltage magnet circuit to the center stud as is the case in Fig. 4 of my Patent No. 585444, granted June 29, 1897, and Figs. 1 and 4 of my Patent No. 719018, granted January 27, 1903, which show speed controlling arms not spring actuated and by such connection the no-voltage magnet is unaffected by the drop in voltage upon the resistance.

In Fig. 7 is illustrated the circuit connections of the controller of Fig. 1. A is the contact arm of the starting rheostat and $a$ the resistance; B the overload switch; D the overload coil; E the "no voltage" coil; R the resistance in series therewith; M the motor and $c$ and $c'$ the resistance and contact of the field rheostat. The line wires are connected to binding-posts 1—2. From post 1 the circuit extends through coil D to switch B, contact arm A and resistance $a$ to posts 3 and 4. The armature of motor M is connected between posts 2 and 3, and the field winding is connected between posts 2 and 4 in series with the field rheostat. The "no voltage" coil is also connected between posts 2 and 3. From the illustration it will be seen that the armature and field winding are in shunt relation; that the overload coil is in series with both the armature and field current; and that the "no voltage" coil is connected across the armature terminals. Fig. 8 is a diagram showing the same connections and parts as Fig. 7 except that the "no voltage" coil E is connected in series with the shunt field winding of motor M, and in such arrangement a resistance in series with coil E is not necessary.

Figure 9:
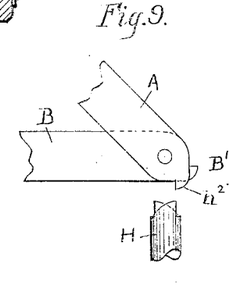
Fig. 9 is a detail view showing the locking means applied to both the "no voltage" and "overload" switches.

In Fig. 9 is shown a locking shoulder B' on the overload switch B. If when resistance is in the field circuit of the motor and bolt H is in locking position and an overload current should flow, switch B in opening the circuit will be locked open and before the circuit can be closed again at switch B, the field rheostat must first be readjusted to unlock the switch.

Figure 10:
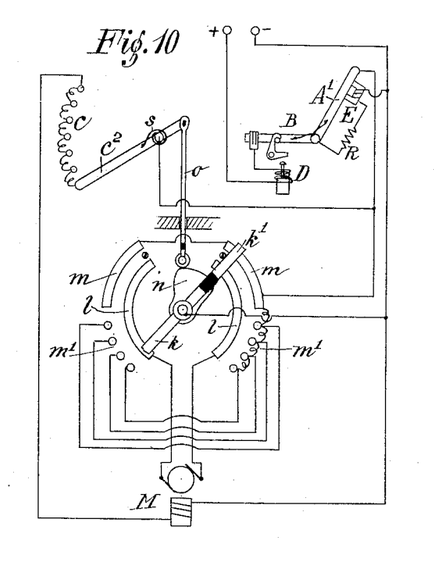
Figs. 10, 11 and 12 are diagrammatic views showing a reversing controller and functionally related field rheostat and circuit breaker.

In Fig. 10 my invention is shown applied to a reversing controller and in which the reversing controller and field rheostat are functionally related so that the resistance of the controller cannot be cut out except when the field is in a certain condition. The armature and field winding of the motor is indicated at M. In the main circuit is a switch comprising the two spring pressed arms A', B, the current passing from one supply terminal through the overload solenoid D, which may act to release arm B and open the circuit, then through arms B and A' through the reversing controller and motor armature to the other supply terminal. Current also passes independently from one side of the line through the resistance R and retaining magnet E to the other side, and there is likewise a circuit across the line including the field of the motor, the field resistance $c$ and the field rheostat arm $c^2$. The movable element of the reversing controller comprises an arm $k$ electrically connected to one side of the line and engaging one or the other of two contact segments $l$ connected to the terminals of the motor armature. The movable element also includes an insulated conducting portion $k'$ which electrically connects the contact segments $l$ with the concentric outer strips $m$ and the contacts $m'$ of the controlling resistance. The operating shaft of the controller carries a cam $n$ on which rides one end of a rod $o$ connected to the field rheostat arm $c^2$, a spring $s$ on arm $c^2$ tending to force the rod against the cam. The position of the arm $c^2$ is consequently determined by the position of the reversing controller. The off position of the controller arm is a vertical one with the part $k'$ downward. Suppose the circuit breaker to be closed and that the controller arm is turned from the off position so that the part $k'$ engages the contacts at the right. The current will then pass from say positive line to right-hand segment $m$, through the armature resistance to part $k'$, segment $l$, motor armature, left-hand segment $l$, arm $k$ to negative line. As the arm is rotated left-handedly, the armature resistance will be gradually cut out and will be all cut out when $k'$ engages segment $m$. During this operation, the rod $o$ has remained at its lowest position by pressure of spring $s$ and all field resistance has therefore been cut out giving a strong field. Upon further movement of the controller, the rod $o$ rides upon an inclined portion of cam $n$, causing field resistance to be gradually cut in giving a further increase in the speed of the motor. This condition is illustrated in the figure. If now it is desired to reverse the motor, the controller arm will be turned in a right-hand direction, which first cuts out the field resistance, then cuts in the armature resistance and then breaks the armature circuit. Continuing the movement brings the part $k'$ in contact with the left-hand contacts and part $k$ in contact with the right-hand segment $l$. Current then passes through the armature resistance and armature in the opposite direction giving reversal in rotation. Further movement of the controller arm cuts out the armature resistance while the field is maintained at full strength and afterward weakens the field as previously explained.

Figure 11:
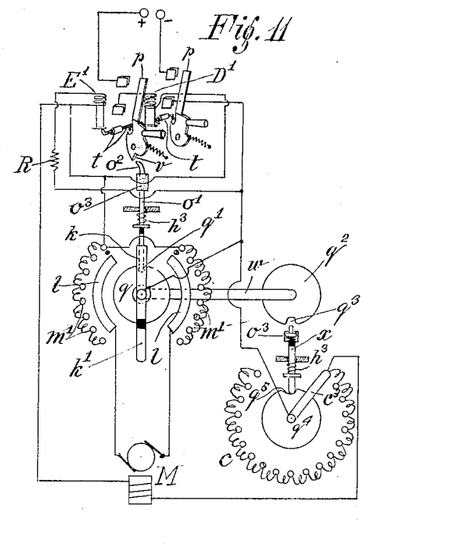

In Fig. 11 I have shown a reversing controller, field rheostat and circuit breaker all functionally related so that the circuit breaker cannot be closed except when the reversing controller is in proper condition and the resistance of the reversing controller cannot be cut out except when the field rheostat is in proper condition. I have shown a double pole circuit breaker having spring pressed independently movable arms each adapted to be held in position by mechanical restraining means, as by latches $t$. The arms are released by the upward movement of the core of the overload solenoid D', or the left hand arm $p$ is released by the fall of the core of the no-voltage solenoid E' which is connected across the line in series with a resistance R. The reversing controller is shown as made up of the two contact segments $l$ and two outer series of resistance contacts $m'$, over which moves the controller arm comprising the part $k$ which contacts with segments $l$ and is connected to one side of the line, and the part $k'$ which makes a connection from segments $l$ to the contacts $m'$. The segments $l$ are connected to the motor armature terminals and the two upper contacts $m'$ to one side of the line. Mounted upon the controller shaft is a circular plate $q$ having a recess $q'$ in one part thereof. A rod $o'$ is forced against said plate as by a spring $h^3$ and carries a projection $o^2$ adapted to engage a notch $v$ in one of the circuit breaker arms $p$. The rod $o'$ has a yieldable section as indicated at $o^3$ similar to that shown in Figs. 3 and 4. Mechanically connected with the shaft of the reversing controller, as by the extended shaft $w$ is a circular plate $q^2$ having a notched portion $q^3$. This notch is adapted to receive one end of a rod $x$ which has a yieldable portion $o^3$ and is pressed downward as a whole by spring $h^3$. The lower end of the rod engages a plate $q^4$ having an inclined notched portion $q^5$. This plate is mounted on the shaft of the field rheostat controlling arm $c^3$. The parts are shown in their open position and the arms of the circuit breaker are free to be closed and the reversing rheostat may be operated since the field resistance is all cut out of the field circuit. If, however, the reversing rheostat were in any other than off position, the rod $o'$ would be raised from the notch of plate $q$ and projection $o^2$ would engage the notch $v$ preventing the closing of one arm of the circuit breaker. Also if the field resistance arm were in any position other than that in which all resistance is cut out, the rod $x$ would be raised and engage the notch $q^3$ preventing the movement of the reversing controller to start the motor unless the field has its full strength. Therefore the circuit breaker cannot be closed unless the reversing controller is in off position and the circuits of the reversing controller cannot be closed unless the field resistance is out of circuit. Starting with the armature resistance in and the field resistance out is consequently imperative. When the reversing controller is turned in one direction from off position, current passes through the armature in one direction and the armature current is reversed by turning the reversing controller in the opposite direction.

Figure 12:
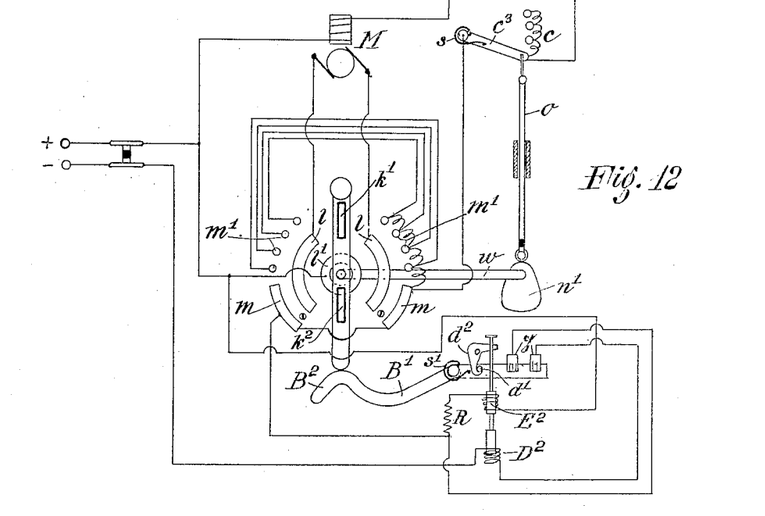

In Fig. 12 I have also shown an interlocked or functionally related reversing controller, field rheostat and circuit breaker. The circuit breaker is shown in the form of a pivoted switch $B'$, spring pressed by spring $s'$ at its pivot so as to tend to move the switch to open the main circuit at contacts $y$. A pivoted latch $d^2$ tends normally to engage the pin $d'$ when the switch is in the closed position and to hold the same closed. A plunger for tripping the latch is shown as having two iron cores. One is acted upon by the coil $E^2$ which forms a circuit across the line in series with a resistance R through switch $B'$ and contacts $y$ and normally tends to hold the plunger up and which, upon occurrence of no-voltage, permits the plunger to fall and trip the latch $d^2$ and allows the circuit breaker to be opened by spring $s'$. The other core is acted upon by coil $D^2$ in series in the main circuit and which upon the occurrence of overload is adapted to draw the plunger down to trip latch $d^2$ and open the circuit.

The reversing controller is provided with the contact segments $l, l$, the contact segments $m$, and the resistance contacts $m'$. The controller arm is provided with an insulated conductor $k^2$ adapted to engage segments $l$ and the plate $l'$ and also provided with an insulated conductor $k'$ adapted to connect the segments $l$ with the segments $m$ or resistance contacts $m'$. The controller arm in the position shown, which is the off position, engages an extension $B^2$ of switch $B'$ so as to close the latter. The plate $l'$ is connected to one supply line and the segments $m$ are connected to the other supply line through switch $B'$ and contacts $y$. The segments $l$ are connected to the armature terminals. The motor field coil is shown connected across the line in series with a variable resistance $c$ and arm $c^3$. The arm $c^3$ is pressed by a spring $s$ tending to return it to such a position that no field resistance is included and also tending to press the rod $o$ which is attached to arm $c^3$, against a cam $n'$. The cam $n'$ is attached to shaft $w$ which is also the shaft of the controller arm. The shape of the cam $n'$ is such that in the off position of the controller, rod $o$ is in its lowest position and all field resistance out of circuit.

When the controller arm is moved in one direction the armature circuit will be closed through the starting resistance and when the circuit is first closed the switch $B'$ will be free to open automatically upon occurrence of overload or no-voltage since the controller arm will not then engage the projection $B^2$. As the controller arm is moved, the armature resistance will be gradually cut out and will be entirely cut out when $k'$ makes contact with one of the segments $m$. Up to this position the shape of cam $n'$ is such that rod $o$ remains in its lowest position, but upon further movement of the controller arm, the rod $o$ will be raised and resistance cut in the field circuit. When the controller arm is moved in the opposite direction, a similar action will take place except that the current through the motor armature will be reversed. It is therefore apparent that if the circuit breaker opens, it can be closed and the motor started again only by first returning the controller arm to off position and when the arm is returned to off position, all field resistance will be cut out.

I do not limit myself to the specific disclosures herein shown and described, as my invention is capable of various embodiments, and I therefore limit my invention only as hereinafter expressed in the claims.

My invention is also capable of use with currents of different forms and with various types of motors, such as motors of direct or alternating current type.

What I claim is:

1. The combination with a motor having a shunt field winding, a rheostat in series with such field winding, a starting rheostat, means tending to move the contact arm thereof toward the initial position and which arm is designed to be held in its final position, an automatic release for said arm, which responds when the supply voltage falls below a certain amount, and means for preventing the starting of the motor when the field rheostat is in a position to cause a weakened field.

2. The combination with a motor having a shunt field winding, a rheostat in series with such field winding, a starting rheostat, means tending to move the contact arm thereof toward the initial position and which arm is designed to be held in its final position, an automatic release for said arm which responds when the supply voltage falls below a certain amount, and mechanical means for preventing the starting of the motor when the field rheostat is in a position to cause a weakened field.

3. The combination with a motor having a shunt field winding, a rheostat in series with such field winding, a starting rheostat, means tending to move the contact arm thereof toward the initial position, and which arm is designed to be held in its final position, an automatic release for said arm which responds when the supply voltage falls below a certain amount, and means for holding said arm against movement from the initial position when the field rheostat is in a position to cause a weakened field.

4. The combination with a motor having a shunt field winding, a rheostat in series with such field winding, a starting rheostat, means tending to move the contact arm thereof toward the initial position and which arm is designed to be held in its final position, an automatic release for said arm which responds when the supply voltage falls below a certain amount, and interlocking means between said arm and the operating device of the field rheostat, whereby said arm is held at the initial position when the field rheostat is in a position to cause a weakened field.

5. The combination with a motor having a shunt field winding, a rheostat in series with such field winding, a starting rheostat, means tending to move the contact arm thereof toward the initial position, electro-magnetically controlled means for holding said arm in its final position, and which means responds to abnormal variations in the motor circuit to effect the release of said arm, and means for preventing the starting of the motor when the field rheostat is in a position to cause a weakened field.

6. The combination with a motor having a shunt field winding, a rheostat in series with such field winding, a starting rheostat, means tending to move the contact arm thereof toward the initial position, electro-magnetically controlled means for holding said arm in its final position, and which means responds to abnormal variations in the motor circuit to effect the release of said arm, and mechanical means for preventing the starting of the motor when the field rheostat is in a position to cause a weakened field.

7. The combination with a motor having a shunt field winding, a rheostat in series with such field winding, a starting rheostat, means tending to move the contact arm thereof toward the initial position, electro-magnetically controlled means for holding said arm in its final position, and which means responds to abnormal variations in the motor circuit to effect the release of said arm, and means for holding said arm against movement from the initial position when the field rheostat is in a position to cause a weakened field.

8. The combination with a motor having a shunt field winding, a rheostat in series with such field winding, a starting rheostat, means tending to move the contact arm thereof toward the initial position, electro-magnetically controlled means for holding said arm in its final position, and which means responds to abnormal variations in the motor circuit to effect the release of said arm, and interlocking means between said arm and the operating device of the field rheostat, whereby said arm is held at the initial position when the field rheostat is in a position to cause a weakened field.

9. The combination with a motor having a shunt field winding, a rheostat in series with such field winding, a starting rheostat, means tending to move the contact arm thereof toward the initial position, an electro-magnet for holding said arm in its final position, and which magnet releases said arm when the supply voltage falls below a certain amount, and means for preventing the starting of the motor when the field rheostat is in a position to cause a weakened field.

10. The combination with a motor having a shunt field winding, a rheostat in series with such field winding, a starting rheostat, means tending to move the contact arm thereof toward the initial position, an electro-magnet for holding said arm in its final position and which magnet releases said arm when the supply voltage falls below a certain amount, and mechanical means for preventing the starting of the motor when the field rheostat is in a position to cause a weakened field.

11. The combination with a motor having a shunt field winding, a rheostat in series with such field winding, a starting rheostat, means tending to move the contact arm thereof toward the initial position, an electro-magnet for holding said arm in its final position, and which magnet releases said arm when the supply voltage falls below a certain amount, and means for holding said arm against movement from the initial position when the field rheostat is in a position to cause a weakened field.

12. The combination with a motor having a shunt field winding, a rheostat in series with such field winding, a starting rheostat, means tending to move the contact arm thereof toward the initial position, an electro-magnet for holding said arm in its final position, and which magnet releases said arm when the supply voltage falls below a certain amount, and interlocking means between said arm and the operating device of the field rheostat, whereby said arm is held at the initial position when the field rheostat is in a position to cause a weakened field.

13. The combination of a motor starting switch and a motor field rheostat with means whereby the starting switch cannot be operated to start the motor except when the field rheostat is in certain positions.

14. The combination of a motor starting switch and a motor field rheostat with mechanical means whereby the starting switch cannot be operated to start the motor except when substantially all the resistance of the field rheostat is out of circuit.

15. The combination of a motor starting switch and a motor field rheostat with interlocking means between the contact arm of the former and the operating device of the latter, whereby the starting switch cannot be operated to start the motor except when substantially all the resistance of the field rheostat is out of circuit.

16. The combination of a motor starting rheostat and a motor field rheostat with means for holding the contact arm of the starter against movement from the initial position when the field rheostat is in a position to cause a weakened field.

17. The combination of a motor starting rheostat and a motor field rheostat with mechanical means for holding the contact arm of the starter against movement from the initial position when the field rheostat is in a position to cause a weakened field.

18. The combination of a motor starting rheostat and a motor field rheostat with interlocking means between the contact arm of the former and the operating device of the latter for holding the contact arm of the starter against movement from the initial position when the field rheostat is in a position to cause a weakened field.

19. The combination with an electric motor having a field winding supplied from a constant electro-motive force source, of a rheostat for varying the field strength of the motor to vary the speed, a rheostat in series with the armature for starting the motor, and means whereby the starting current cannot be passed through the armature except when the resistance in the field circuit is practically all cut out, so that the motor field is fully excited when the motor starts.

20. The combination with an electric motor having a field winding supplied from a source of electro-motive force, of a field rheostat for varying the strength of the field, a rheostat in series with the armature, a no-voltage release device for protecting the armature circuit in case of no-voltage, an overload circuit breaker for protecting the armature circuit in case of excessive current, means for preventing the closure of the circuit breaker when there is no resistance in the armature circuit, and means for preventing the starting up of the motor armature except when the motor field is at a proper strength.

21. The combination of a field rheostat for varying the speed of a motor upon a constant electromotive force circuit, and means for preventing the passage of the starting current through the motor armature when the motor field rheostat is in a certain position.

22. The combination with a motor operating upon a constant electromotive force circuit, means for weakening the field strength of the motor for the purpose of increasing its speed, and means for preventing the starting up of the motor when the field is in the weakened condition.

23. The combination with a direct current motor operating upon a constant electromotive circuit, means for varying the speed of the motor, separate means for starting the motor, and means for preventing the starting of the motor when the speed varying means is in the position corresponding to the maximum speed.

24. In a motor controller, the combination of a rheostat designed to control the armature circuit, a rheostat designed to control the field circuit, and means whereby the armature rheostat is held to prevent the closure of the armature circuit under certain predetermined conditions.

25. In a motor controller, the combination of a rheostat designed to control the armature circuit, a rheostat designed to control the field circuit, and interlocking means between the two rheostats whereby the armature rheostat is held to prevent the closure of the armature circuit when the field rheostat is in a certain predetermined position.

26. In a motor controller, the combination of a rheostat designed to control the armature circuit, a rheostat designed to control the field circuit, an automatic circuit breaker responding to abnormal conditions in the circuit, and means whereby the circuit breaker is held against closure until the field rheostat is adjusted so as to give the motor a field of proper strength to produce the starting torque without undue sparking.

27. In a motor controller, the combination of a rheostat designed to control the armature circuit, a rheostat designed to control the field circuit, an automatic circuit breaker responding to abnormal conditions in the circuit, and interlocking means between the circuit breaker and the field rheostat whereby the circuit breaker is held against closure until the field rheostat is adjusted so as to give the motor a field of proper strength to produce the starting torque without undue sparking.

28. The combination of a motor having a field winding energized by a current independent of its armature current, means for controlling the current in said winding, and means adapted to start, stop and vary the speed of the motor, said two means being independently movable but functionally connected mechanically.

29. The combination with motor having a shunt field winding, of means for controlling the field circuit, means for controlling the armature circuit, and means so arranged that the armature circuit cannot be made until the field circuit controlling means is in a certain position.

30. The combination with a motor having a shunt field winding, of a variable resistance in the field circuit, means for varying the said resistance, means for controlling the armature circuit, and interlocking means so arranged that the armature circuit cannot be made until the field is at its strongest.

31. The combination with a motor having a shunt field winding, of a resistance in the field circuit, said resistance being capable of variation, a regulating handle adapted to vary said resistance, means for controlling the armature circuit, and means for interlocking said handle and armature circuit controlling means and preventing the closing of the armature circuit until the motor shunt field has its greatest field strength.

32. The combination with a motor having a field winding energized by a current independent of the armature current, means for affecting the current in said field circuit, means for affecting the current in the armature circuit, and means so arranged that the armature starting current cannot be passed through the armature until the field circuit controlling means are in a desired position.

33. The combination of a motor having a shunt field winding, an overload magnetic circuit breaker, a spring actuated resistance controlling arm, a no-voltage device, said device being responsive solely to the line voltage and independent of the current through the motor armature or field, and a field rheostat so arranged that the motor cannot be started in a weak field.

34. The combination with a motor and a circuit controller comprising means responsive to no voltage which is not in series with the armature current, and means responsive to overload current, of field controlling means functionally related to said circuit controller.

35. The combination with a motor and a circuit controller comprising means responsive to no voltage which is not in series with the armature current, and means responsive to overload current, of field controlling means functionally related to said controller mechanically.

36. The combination of an electric motor and a constant electromotive force supply circuit, said motor having a field winding energized by a current independent of the current through its armature, a no-voltage protective device responsive to the line voltage solely and independent of the current through the motor field or armature and which upon no voltage responds and protects the armature against the re-establishment of the line electromotive force, and an independent overload circuit breaker functionally related mechanically to the no-voltage device so that the circuit breaker can be closed only when the no-voltage device is in a protective position.

37. The combination of an electric motor and a constant electromotive force supply circuit, said motor having a field winding energized by a current independent of the armature current, a circuit in parallel with the motor, said circuit containing an electro-responsive device and a relatively high resistance, said electro-responsive device responding to no voltage to release a spring actuated device which when released, moves and protects the motor armature circuit against excessive current when the line electromotive force is re-established, and an independently acting protective device responsive to overload current in the armature circuit.

38. The combination of an electric motor and a constant electromotive force supply circuit, said motor having a field winding energized by a current independent of the armature current, a circuit in parallel with the motor, said circuit containing an electro-responsive device and a relatively high resistance, said electro-responsive device responding to no voltage to release a spring actuated device which when released, moves and protects the motor armature circuit against excessive current when the line electromotive force is re-established, and functionally related means for varying the motor field current.

39. The combination of an electric motor and a constant electromotive force supply circuit, said motor having a field winding energized by a current independent of the armature current, a circuit in parallel with the motor, said circuit containing an electro-responsive device responding to no voltage to release a spring actuated device which when released, moves and protects the motor armature circuit against excessive current when the line electromotive force is re-established, means for varying the field strength, and means which insures starting the motor under a field of predetermined strength.

40. The combination of an electric motor having a shunt field winding, an electro-responsive circuit controlling device responsive to overload current, an electro-responsive circuit controlling device responsive to no voltage, and a device for varying the field strength of the motor, said latter device being functionally related to at least one of said controlling devices.

41. The combination of an electric motor having a field winding energized by a current which is independent of the armature current, mutually independent means for protecting the motor against occurrence of no voltage and overload respectively, and means for varying the current in said field winding, said latter means being functionally related mechanically to said protecting means.

42. The combination of an electric motor, a no-voltage protective device responsive to the line voltage solely and independent of the current in the motor field or armature, an overload device responsive to predetermined overload current through the motor, and a speed controlling rheostat for affecting the field strength of the motor functionally related to at least one of said devices.

43. The combination of an electric motor, a no-voltage protective device responsive to the line voltage solely and independent of the current in the motor field or armature, and functionally related means for varying the speed of the motor by varying the field strength of the motor.

44. The combination of an electric motor, an electro-magnetic circuit breaker in series with the armature of the motor, a rheostat for controlling the field strength of the motor, said circuit breaker and rheostat being functionally related mechanically.

45. The combination with an electric motor, of means for affecting the current in one element thereof, means for affecting the current in the other element thereof, said two means being correlated and each being independently movable of the other under certain conditions, and a device for controlling one of said means under certain conditions, said device being responsive to a current other than the motor armature current.

46. The combination of a device comprising a resistance for controlling the energy in one element of an electric motor, a second device comprising a different resistance for controlling the energy in the other element of the motor, said devices being functionally related to prevent their improper operation, and electro-magnetic means for protecting one element of the motor against two different abnormal conditions.

47. The combination of an electric motor and a constant electromotive force supply circuit, said motor having a field winding energized by a current independent of the armature current, and means for protecting the motor against no-voltage and overload current, said no-voltage means comprising a circuit in parallel with the motor, and said circuit containing an electro-responsive device and a relatively high resistance, and said overload means comprising a device in series with the armature current.

48. The combination of an electric motor having a field winding energized by current which is independent of the armature current, a controlling device in series with the motor armature, mutually independent means for protecting the motor against occurrence of no-voltage and overload respectively, and field varying means for speed variation, said latter means being protectively related to the said device in series with the motor armature.

49. The combination of supply mains, a circuit across said mains containing one element of an electric motor and a controlling device, a second circuit across said mains containing the other element of the motor and a controlling device therefor, and a third circuit across said mains containing a protective device for the motor, said protective device being functionally related to one of said controlling devices and said controlling devices being functionally related to each other.

50. The combination of a motor having a field winding energized independently of its armature current controlling means for varying the effective electromotive force on the motor armature, independently movable correlated means for varying the effective electromotive force on said field winding, and means for protecting the motor armature against no-voltage and against overload current.

51. The combination of an electric motor, means for varying the speed of the motor by varying the effective electromotive force on the motor armature and on a field winding of the motor, and an electro-responsive protective device, said device being energized by a current independent of the current in the motor armature or field.

52. The combination of an electric motor, means for varying the speed of the motor by varying the effective electromotive force on the motor armature and on a field winding of the motor, an electro-responsive protective device, said device being energized by a current independent of the current in the armature or field, and an electro-responsive protective device in series with the motor armature.

53. The combination of an electric motor, speed controlling means affecting the armature winding, speed controlling means affecting the field winding, and electro-responsive means or protecting the motor upon occurrence of overload and no-voltage, said no-voltage means being responsive to a current other than that passing through the motor armature winding or that passing through the motor field winding.

54. The combination of an electric motor, means for varying the speed of the motor by varying the effective electromotive force on its armature winding, cor-related independently acting means for varying the speed by varying the effective electromotive force on its field winding, and protective means responsive to abnormal electromotive force on the motor armature and to abnormal current through the motor armature.

55. The combination of an electric motor, a no-voltage protective electro-responsive winding, a high resistance in series therewith and not in series with the motor armature, and an electro-responsive winding in series with the motor armature which acts independently of the no-voltage winding to protect the motor armature against overload current.

56. The combination of an electric motor, means for varying a resistance in series with the motor armature, functionally related means for varying the field strength of the motor, and independently movable functionally related means for protecting the motor armature circuit against overload current.

57. The combination of an electric motor, means for varying a resistance in series with the motor armature, functionally related means for varying the field strength of the motor, and independently movable functionally related means for protecting the armature against overload current and against no-voltage.

58. The combination of an electric motor, means for varying the effective electromotive force upon the terminals of one element of the motor, electro-responsive means not in series with either element of the motor for protecting the motor against conditions due to failure of supply electromotive force, and an independent electro-responsive means for protecting the motor against overload.

59. The combination of a translating device, a controlling resistance having a movable element, two independently movable functionally related switches in series with each other, and means whereby the said element must be in a proper position before the circuit can be closed through said two switches.

60. In combination, a movable member, a resistance controlled thereby, a second movable member, a resistance controlled by the latter member, means rendering the former member ineffective in controlling the resistance thereof while the latter member occupies predetermined positions, and a protective electro-responsive winding in series with the latter member.

61. In hand operated motor controlling apparatus, the combination of two movable switch elements in series with each other and with the motor armature, means protectively related to said elements for preventing a damaging current to flow through the armature due to improper manipulation by the operator, at least one of said elements being automatically and protectively moved in response to overload current through the motor armature, a third movable element for controlling the strength of the magnetic field of the motor, and means for functionally relating said field controlling element and at least one of said armature controlling elements for insuring the movement of the field controlling element to a proper position before the starting current can be passed through the motor armature.

62. In hand operated motor controlling apparatus, the combination of two movable elements, one of said elements being adapted to control the armature circuit and the other the field circuit of the motor, means for protectively cor-relating said elements for insuring proper field strength before the armature starting current can be passed through the motor, and a no-voltage protective means comprising a magnetic winding connected in a circuit independent of the armature or field circuit of the motor.

63. In hand operated motor controlling apparatus, the combination of two movable elements, one of said elements being adapted to control the armature circuit and the other the field circuit of the motor, means for protectively cor-relating said elements for insuring proper field strength before the motor armature starting current can be passed through the motor, and a no-voltage protective means comprising a magnetic winding connected in a circuit independent of the armature or field circuit of the motor, the armature circuit, field circuit and the circuit containing the no-voltage winding being all in parallel with each other and the current to all three circuits being controlled by at least one of said elements.

64. The combination of an electric motor having a field winding energized independently of its armature current, a no-voltage protective device for the motor armature energized independently of the armature or field current of the motor, and two resistance controlling movable elements, one adapted to control the motor armature and the other adapted to control the motor field, said two elements being protectively cor-related.

65. The combination with an electric motor, of means for gradually increasing the electromotive force upon the armature while maintaining practically the full electromotive force upon the field winding and for gradually decreasing the electromotive force upon the field winding while maintaining practically the full electromotive force upon the armature, and means for protecting the armature upon occurrence of overload current, said latter means comprising an automatic switch in series with the armature and protectively related as to its closure to the first named means, and a no-voltage device in which the restraining means is unaffected by operative variations in the electromotive force on the motor field winding.

This specification signed and witnessed this 7th day of July 1903.

H. WARD LEONARD.

Witnesses:
FLORENCE PHILBROOK,
HUGO BOEPPLE, Jr.